United States Patent
Budde et al.

(10) Patent No.: US 7,325,289 B2
(45) Date of Patent: Feb. 5, 2008

(54) HIGH-PERFORMANCE BALL AND SOCKET JOINT WITH LOW TORQUES

(75) Inventors: Frank Budde, Damme (DE); Thomas Richter, Damme (DE); Achim Möll, Rahden (DE); Jürgen Gräber, Stemwede-Dielingen (DE)

(73) Assignee: ZF Lemforder Metallwaren AG (DE)

( * ) Notice: Subject to any disclaimer, the term of this patent is extended or adjusted under 35 U.S.C. 154(b) by 488 days.

(21) Appl. No.: 10/900,744

(22) Filed: Jul. 28, 2004

(65) Prior Publication Data

US 2005/0005440 A1 Jan. 13, 2005

Related U.S. Application Data

(63) Continuation of application No. PCT/DE03/02386, filed on Jul. 16, 2003.

(30) Foreign Application Priority Data

Jul. 25, 2002 (DE) .............................. 102 33 798

(51) Int. Cl.
*B23P 25/00* (2006.01)
*B21D 53/00* (2006.01)
*F16C 11/00* (2006.01)

(52) U.S. Cl. ...................... 29/458; 29/895.2; 29/895.3; 409/122

(58) Field of Classification Search .................. 29/895, 29/895.3, 895.2, 895.21, 458, 469, 510, 515, 29/428; 403/119, 122, 127, 128, 131
See application file for complete search history.

(56) References Cited

U.S. PATENT DOCUMENTS 3,231,299 A 1/1966 Birney et al.
3,231,963 A 2/1966 Berar, Jr. et al.
4,971,473 A * 11/1990 Schafer et al. .............. 403/140
6,019,541 A * 2/2000 Maughan .................... 403/140

FOREIGN PATENT DOCUMENTS

DE 31 27 710 1/1983

(Continued)

*Primary Examiner*—John C. Hong
(74) *Attorney, Agent, or Firm*—McGlew & Tuttle P.C.

(57) ABSTRACT

A process is provided for manufacturing a ball and socket joint that has a ball pivot (2) that is composed of a pivot pin (3) with an essentially spherical ball head (4) arranged or made integrally in one piece on one side. A bearing shell (5) is provided as well as a preformed plastic film as a thin-walled ball socket (7) with a joint surface (8) enclosing the ball head at least partially. A lubricant (9) is introduced between the surface of the ball head (4) and the joint surface (8) of the thin-walled ball socket (7). According to the process, the thin-walled ball socket (7) is filled first with the lubricant (9). The ball head (4) of the ball pivot (2) is then introduced into the thin-walled ball socket (7) filled with lubricant (9), and the ball head (4) provided with the thin-walled ball socket (7) is subsequently introduced into the housing (10). Finally, the free space between the thin-walled ball socket (7) and the housing (10) is filled up with a material to form a bearing shell (5). The ball and socket joint (1) is formed with a preformed plastic film as a thin-walled ball socket (7).

23 Claims, 3 Drawing Sheets

FOREIGN PATENT DOCUMENTS

| | | |
|---|---|---|
| DE | 41 08 219 | 9/1992 |
| DE | 299 11 923 | 1/2001 |
| GB | 840686 | 7/1957 |
| GB | 2 103 532 | 2/1983 |
| JP | 05071528 | 3/1993 |

* cited by examiner

HIGH-PERFORMANCE BALL AND SOCKET JOINT WITH LOW TORQUES

CROSS REFERENCE TO RELATED APPLICATION

This is a continuation of and claims the benefit (35 U.S.C. §120 and 365(c)) of copending International Application PCT/DE 2003/002386 of Jul. 16, 2003, which designated inter alia the United States and which claims the priority of German Application DE 102 33 798.5 of Jul. 25, 2002. The entire contents of each application is hereby incorporated by reference in its entirety.

APPENDIX

List of Reference Numbers 1, 1a, 1b, 1c, 1d Ball and socket joint
2 Ball pivot
3 Pivot pin
4 Ball head
5 Bearing shell
6, 6a Plastic film
7, 7a, 7b Ball socket
8 Joint surface
9 Lubricant
10 Housing
11 Opening in plastic film
12 Bottom of plastic film
13, 13a, 13b Chamber
14, 14a Lubricant reservoir
15, 15a, 15b Sealing bellows
16 First rubber ring
17 Second rubber ring
18 Ring
19 Upper housing edge
20 Rubber ring
21 Separate rubber ring

FIELD OF THE INVENTION

The present invention pertains to a ball and socket joint, especially a ball and socket joint for high bearing loads.

BACKGROUND OF THE INVENTION

Standard ball and socket joints usually comprise a housing, a ball socket made of plastic, a lubricant, e.g., grease, a ball pivot and a sealing system, in general, in the form of a sealing bellows.

Under high loads, e.g., a high pressure load on the bearing or at a high operating temperature, a ball socket made of plastic tends to undergo a change in shape due to the creep of the plastic material. The creep process depends not only on the operating temperature and the mechanical load of the ball socket, but is also affected by the wall thickness of the ball socket. In general, the thicker a ball socket, the more probable is a change in shape of the ball socket due to the creep of the plastic material under high load. If the material of the ball socket creeps too intensely, clearance will develop in the ball and socket joint, which is associated with a great increase in the wear of the material on the joint surface. Standard ball and socket joints with all-plastic sockets can therefore be used only at relatively low pressure loads in the area of the joint surface, so-called surface pressures, and at moderate temperatures.

Ball and socket joint systems with very thin plastic ball sockets are therefore preferred for applications in which higher surface pressures and higher operating temperatures are required.

A process for manufacturing a ball and socket joint, according to which the ball head of a ball pivot is coated with a plastic possessing good lubricating properties, and the coated ball surface is subsequently jacketed with a fiber braiding, is therefore proposed in the patent specification DE 41 08 219 C2. The coated and jacketed ball head is then positioned in a housing mold, and the free space between the fiber braiding applied and the housing mold is filled with a two-component plastic such that it embeds in it the fiber braiding lying on the surface of the coated joint ball. The fibers of the fiber braiding must be oriented corresponding to the directions of the principal loads acting on the ball and socket joint, and the manufacture of the fiber jacketing is therefore somewhat complicated.

The process disclosed in the Offenlegungsschrift DE 31 27 710 A1 for manufacturing a ball and socket joint provides, in contrast, for coating the ball head with a lubricant before a lost form made of a synthetic material is applied to the coated ball head. The ball head thus prepared is subsequently positioned in a mold for the joint housing, and the free space between the prepared ball head and the mold is finally filled out with a synthetic material to form the joint housing. The lost form jacketing the lubricant may consist of a plastic, which solidifies in the form of a thin film. According to this process, the processing temperature of the plastic must be below the drop point of the lubricant used, because the inner surface of the ball socket could otherwise adapt itself to concave deviations of the ball head from the spherical shape. High torques of the joint, associated with rapid wear of the joint, would result as a consequence.

SUMMARY OF THE INVENTION

The object of the present invention is therefore to provide a simple process for manufacturing a ball and socket joint with low joint torques, wherein the ball and socket joint is designed for high mechanical loads or surface pressures and high operating temperatures.

The object of the present invention is accomplished by a process for manufacturing a ball and socket joint with a ball pivot, comprising a pivot pin with an essentially spherical ball head, which is arranged or made integrally in one piece on one side, with a bearing shell, with a preformed plastic film as a thin-walled ball socket with a joint surface partially surrounding the ball head, and with a lubricant introduced between the surface of the ball head and the joint surface of the thin-walled ball socket, with the following process steps:
a) Filling of the thin-walled ball socket with the lubricant,
b) introduction of the ball head of the ball pivot into the thin-walled ball socket filled with lubricant,
c) introduction of the ball head provided with the thin-walled ball socket according to process step b) into a housing,
d) filling up at least part of the free space between the thin-walled ball socket and the housing with a material to form the bearing shell.

The use of a preformed plastic film as a thin-walled ball socket makes it possible to design a ball and socket joint for high surface pressures, because creep of the plastic material and an associated deformation of the geometry of the joint surface is ruled out in case of thin plastic films. Since the thin-walled ball socket consists of an already preformed plastic film, the need to coordinate the drop point of the lubricant with the processing temperature of the plastic film is eliminated. Both the lubricant and the plastic film material can therefore be selected corresponding to the load requirements to be met with the ball and socket joint.

The preformed plastic film used as a thin-walled ball socket may be shaped at a low cost by deep drawing a plastic tube, which is open on one side or on both sides. For simple mounting, the preformed plastic film has the shape of a cap with an opening, and the bottom of the cap has an essentially spherical convex shape, so that a sliding surface adapted to the spherical geometry of the ball head is formed, which guarantees good mobility of the joint with low torques.

Long service life of the ball and socket joint can be achieved by providing a lubricant reservoir in the area of the joint surface. The preformed plastic film therefore advantageously has at least one chamber for receiving a lubricant reservoir in the area of the joint surface. The chamber for receiving the lubricant reservoir is formed economically by tying up and/or welding together an end of a thin-walled plastic tube especially if a plastic tube that is open on both sides is used to manufacture the preformed plastic film. The tying up may be performed, for example, with a rubber ring with a small internal diameter.

The highest mechanical loads and consequently the highest surface pressures occur in many types of applications of a ball and socket joint according to the present invention on the joint surface in the equatorial area of the joint. In a preferred embodiment of the present invention, the preformed plastic film with a chamber for receiving a lubricant reservoir is therefore formed in the equatorial area of the joint surface.

It is not always guaranteed after prolonged non-use or under extreme mechanical loads that the surface of the ball head is provided with lubricant. A solid contact between the ball head and the thin-walled ball socket cannot therefore be ruled out during operation. Besides chemical resistance to the lubricants being used, the material of the plastic socket must therefore also possess good tribological properties in case of solid contact in order to keep the wear of the ball and socket joint extremely low. The preformed plastic film for the thin-walled ball socket is therefore advantageously made of a thermoplastic, an elastomer, a thermoplastic elastomer or a combination of at least two of these materials.

The service life of a ball and socket joint may be markedly reduced by the penetration of dirt particles into the space between the thin-walled ball socket and the ball head. The opening of the preformed plastic film is therefore designed as a sealing bellows in a preferred embodiment of the present invention.

The bearing shell of a ball and socket joint must absorb all the forces occurring in it without deformation of the joint surface being brought about. A duroplastic material, which does not tend to flow even under high loads, is therefore preferably used to form the bearing shell.

To set a defined joint torque, the housing of the ball and socket joint is advantageously deformed or braced against the bearing shell.

A ball and socket joint according to the present invention may be used, e.g., to embody wheel suspensions or steering linkages in motor vehicles.

The present invention will be explained in greater detail below on the basis of embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
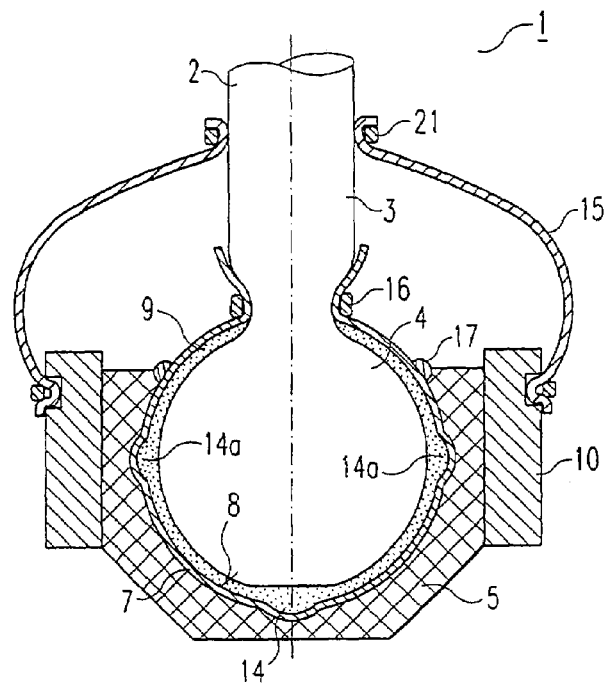
FIG. 1a is a sectional view showing a first embodiment of a ball and socket joint according to the present invention.

Referring to the drawings in particular, the references numbers of elements that are different from one another but are equivalent to one another have the same number followed by a letter characterizing the embodiment.

FIG. 1a shows a first embodiment of a ball and socket joint 1 according to the present invention. The ball and socket joint 1 comprises a ball pivot 2, which is mounted in a thin-walled ball socket 7, and a bearing shell 5, which carries at least the part of the thin-walled ball socket 7 that is subject to the bearing forces. The ball pivot 2 may have a one-part or two-part design. It comprises a pivot pin 3 and an essentially spherical ball head 4 at one end of the pivot pin 3. In case of a one-part ball pivot 2, the ball head 4 is made integrally in one piece with the pivot pin 3, whereas the pivot pin 3 and the ball head 4 are shaped in separate manufacturing processes and then connected to form a ball pivot 2 in case of a two-part ball pivot 2.

The ball head 4 of the ball pivot 2 is surrounded by a lubricant 9 in the ball and socket joint 1 according to the present invention. The lubricant 9 separates the surface of the ball head 4 from the inner surface of a thin-walled ball socket 7. The shape of the inner surface of the thin-walled ball socket 7 is essentially spherical, and only convex deviations from the spherical shape, i.e., especially no concave deviations in the direction of the center of the sphere, are permitted. The condition of the essentially spherical shape of the thin-walled ball socket 7 applies only to the area of the inner surface of the thin-walled ball socket that is used as a joint surface 8. A joint surface 8 is defined as the part of the ball socket 7 that transmits the forces acting on the joint between the ball head 4 and the ball socket 7.

The bearing shell 5 is surrounded by a housing 10. A groove, which is used to fasten a sealing bellows 15, may be provided in the housing 10. The sealing bellows 15 seals off the joint space above the ball head against the pivot pin 3. It prevents dust and other particles or even moisture from penetrating into the interior of the ball and socket joint 1.

Figures 1B, 1C:
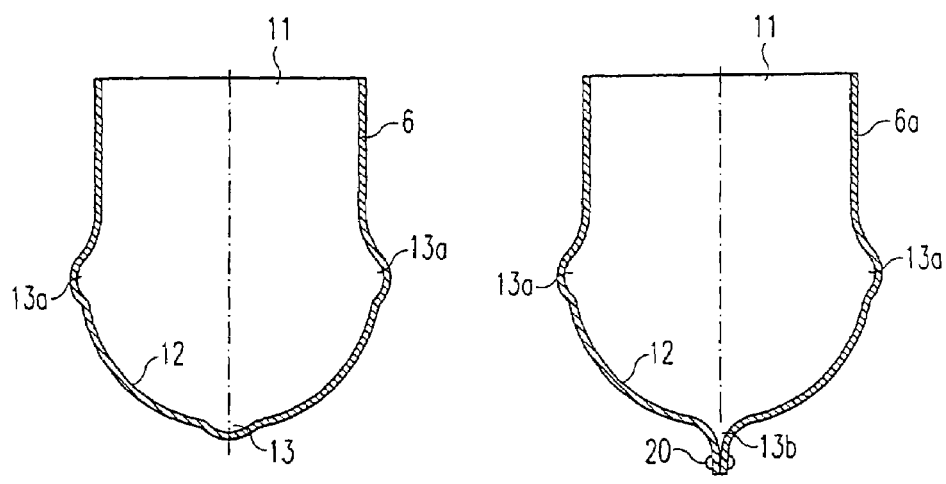
FIG. 1b is a sectional view of a variant of an embodiment of a preformed plastic film according to the present invention.
FIG. 1c is a sectional view of another variant of an embodiment of a preformed plastic film according to the present invention.

A preformed plastic film 6, e.g., such as that shown in FIG. 1b and in FIG. 1c, is used according to the present invention as a thin-walled ball socket 7. The preformed plastic film 6 may be manufactured according to the prior-art manufacturing processes. It is preferably manufactured from a plastic tube that is open on one side or also on both sides by deep drawing. It shall be borne in mind in this connection that the thickness of the preformed plastic film 6 be sufficiently thin in the area of the later joint surface 8, so that no creep of the plastic material can occur under the load conditions of the finished ball and socket joint 1.

As an alternative to manufacturing the preformed plastic film 6 from a plastic tube that is open on one side or on both sides, this film may also be obtained by deep drawing from a flat plastic film.

FIGS. 1*b* and 1*c* each show an example of a preformed plastic film 6. The plastic film according to FIG. 1*b* is made, for example, of a plastic tube open on one side or from a flat plastic film by deep drawing. The preformed plastic film 6 according to FIG. 1*c* is formed from a plastic tube that is open on both sides. The lower end may be closed with a rubber ring 20 or by welding. The preformed plastic film 6 has an opening 11 for introducing the ball head 4 and a bottom 12, whose spherical curvature is adapted to the diameter of the ball head.

Lubricant reservoirs 14 and 14*a* are advantageously formed in a ball and socket joint 1 in or near the areas in which the highest mechanical load is expected to occur. Chambers 13 or 13*a* and 13*b* are formed for this purpose in the preformed plastic film 6. The highest surface pressures occur under axial load on the ball and socket joint 1 in the area of the pole surface, i.e., the ball head-side end of the ball pivot 2. A convex chamber 13 is therefore advantageously formed in the lower middle of the bottom of the preformed plastic film 6 for receiving a lubricant reservoir 14. If a plastic tube that is open on both sides is used to form a plastic film 6*a* according to FIG. 1*c*, a corresponding chamber 13*b* for receiving a pole-side lubricant reservoir 14 is automatically formed by welding the bottom-side end or by tying up this end with a closing rubber ring 20.

In many applications of ball and socket joints 1, the highest mechanical loads on the joint surface and consequently the highest surface pressures occur in the equatorial area of the ball and socket joint surface. Chambers 13*a* are therefore advantageously also formed in this area in the preformed plastic film 6. To provide the entire equatorial area of the joint surface with a lubricant reservoir, the equatorial chamber 13*a* may be made toroidal to form an equatorial lubricant reservoir 14*a*. However, it is also possible to provide a plurality of convex bulges of the plastic film in the equatorial area of the joint surface.

For use as a thin-walled ball socket 7, the wall thickness of the preformed plastic film is typically 0.1 mm or less. However, it is also possible to provide greater wall thicknesses if materials with a low tendency to creep are used. In general, the wall thicknesses of the prefabricated plastic film 6 or 6*a* are, however, thin enough to be placed without folding on the part of the ball and socket joint facing the pivot pin 3 as well as the pivot pin itself.

In the examples of a preformed plastic film 6 and 6*a* shown in FIG. 1*b* and 1*c*, the diameter of this film is constant above the equatorial area of the joint surface and is approximately equal to the diameter of the ball head 4 itself. As an alternative to this, the spherical shape of the ball head may be continued in the preformed plastic film 6 in the area above the equatorial plane as well, so that the opening approximately corresponds to the diameter of the transition between the ball head 4 and the pivot pin 3, to the diameter of the pivot pin itself or to a lower value. If the opening 11 is narrower than the diameter of the ball head, the opening is briefly stretched during the pressing in of the ball head 4 into the preformed plastic film 6, but it will then again retract to its original size above the ball head and will eventually adapt itself to the pivot pin.

The basic features of the process according to the present invention for manufacturing a ball and socket joint according to the present invention will be explained below. In a first step, a preformed plastic film 6 or 6*a*, e.g., a preformed plastic film according to one of the examples in FIGS. 1*b* and 1*c* or one of the above-described types of a preformed plastic film is filled with a lubricant. The amount of lubricant 9 filled in is selected to be such that the space between the outer surface of the ball head and at least the part of the inner surface of the thin-walled ball socket made of the preformed plastic film 6 or 6*a*, which said part is used as a joint surface 8, is filled with the lubricant. In particular, the amount of lubricant 9 filled in guarantees the filling of the lubricant reservoirs 14 and 14*a* formed by the chambers 13 or 13*a* as well as possibly 13*b* in the ball socket. Lubricants based on calcium or lithium soaps, molybdenum disulfide, silicone or lubricating greases may be used as lubricants.

Subsequent to the filling of the preformed plastic film 6 or 6*a* with a lubricant, the ball pivot 2 with the ball head 4 pointing forward is pressed into the preformed plastic film 6 or 6*a*. The lubricant present in the plastic film is now distributed over the contact area between the outer surface of the ball head 4 and the inner surface of the preformed plastic film 6 or 6*a*. If the plastic film 6 or 6*a* is not already shaped such that it closes around the ball head 4 and possibly around the lower part of the pivot pin 3 adjoining the ball head 4 during the pressing in of the ball head 2 into the film 6 or 6*a*, the film can be made to form a unitary piece (closed) with the pivot pin 2 by means of a first rubber ring 16, as is shown in FIG. 1*a*. The inner surface 8 of the thin-walled ball socket 7 manufactured from the preformed plastic film 6 according to this process step, which said inner surface 8 is located opposite the outer surface of the ball head 4, forms the joint surface, defined as a support and wear surface between the ball head 4 and the bearing shell 5 of the ball and socket joint 1 according to the present invention.

In the next step, the ball pivot 2 with the filled thin-walled ball socket 7 is positioned in a housing 10. The free space between the outer surface of the thin-walled ball socket 7 and the inner surface of the housing is subsequently filled out with a material to form a bearing shell 5 to the extent that the preset mobility of the ball pivot 2 is given and the joint surface 8 is supported in the mechanically loaded area.

A second rubber ring 17, which prevents the ball socket 7 from being displaced in the bearing shell 5, may be inserted or cast in at the interface between the part supported by the bearing shell 5 and the free part of the ball socket 7.

For example, a duroplastic material, for example, a resin, may be used as the material to form a bearing shell 5. This resin is poured into the intermediate space between the ball socket 7 and the housing 10 and it is cured there to form the bearing shell 5. To obtain high strengths and a low coefficient of thermal expansion, the resin may be mixed, for example, with fibers. The housing 10 may be removed subsequent to the filling or it may remain at the bearing shell to form an outer wall of the bearing shell.

Materials that also remain dimensionally stable under higher mechanical loads are, in general, suitable for manufacturing the bearing shell. Duroplastic plastics, such as epoxide polyester resins, but also glass fiber-reinforced molding compositions or metals with low melting points are especially suitable for this purpose.

As was mentioned above, solid contact may develop between the ball head 4 and the joint surface 8 of the thin-walled ball socket 7 under extreme loads or after prolonged periods of non-use of a ball and socket joint. The material of the ball socket must guarantee good tribological properties in this case. Good tribological properties are defined especially as a low coefficient of friction as well as low wear of the material in case of solid contact. The creep resistance of the ball socket 7 is reached even by designing the ball and socket joint according to the present invention with a small wall thickness of the ball socket 7. The ball socket is supported against the mechanical loads acting on the ball and socket joint by the bearing shell 5. Further requirements on the material of the ball socket 7 are chemical resistance to the lubricant 9 and the substances to which the ball and socket joint 1 is exposed in the particular fields of use as well as resistance to the temperatures occurring during the operation.

Materials, such as thermoplastics, elastomers, thermoplastic elastomers or a combination of at least two of these materials are therefore especially suitable for use as materials for manufacturing the thin-walled ball socket 7 and consequently for manufacturing the preformed plastic film 6 or 6a. In particular, materials such as polyoxymethylene (POM), thermoplastic polyurethane (TPU), polyamide, polytetrafluoroethylene, polyvinyl chloride-acetate copolymer or polyethylene may be used as materials for manufacturing the ball socket 7.

As an alternative to the use of a separate sealing bellows 15 to seal the ball and socket joint against harmful environmental effects, which is shown in FIG. 1a, the sealing bellows may also be designed as an integral continuation of the ball socket 7a or 7b. Examples of corresponding embodiment are shown in FIGS. 2a and 2b.

Figure 2A:
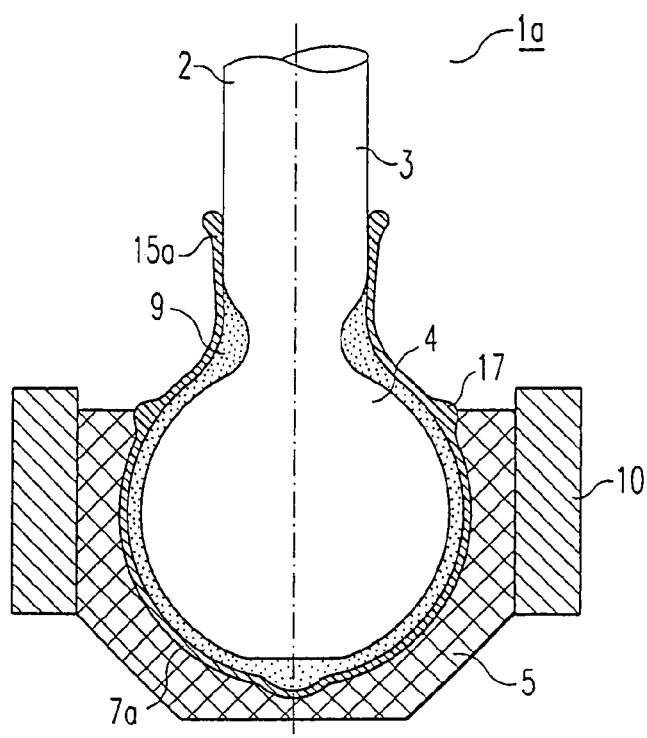
FIG. 2a is a sectional view showing a second embodiment of a ball and socket joint according to the present invention.
Figure 2B:
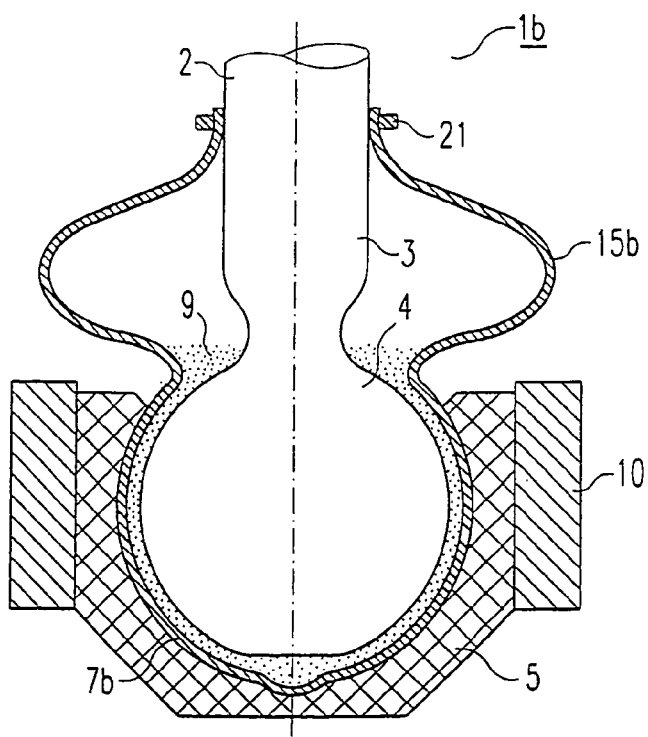
FIG. 2b is a third embodiment of a ball and socket joint according to the present invention.

In the embodiment 1a according to FIG. 2a, the sealing bellows 15a is integrated in the ball socket 7a such that the ball socket tightly adjoins the pivot pin 3 above the shoulder between the pivot pin 3 and the ball head 4. The ball socket 7a is advantageously made of a thermoplastic elastomer in this case. For increased sealing force, the diameter of the opening 11 of the ball socket 7a is selected to be smaller than the diameter of the pivot pin 3 and the edge closure of the opening is made thicker. The thickening may be produced by a corresponding processing of the edge of the opening or by incorporating a rubber ring in the plastic film. Instead of the use of a separate second rubber ring 17 to fix the ball socket in the bearing shell 5, securing against may also be achieved in the form of an increase in wall thickness at the corresponding point. The embodiment of a sealing bellows 15a shown in FIG. 2a protects the joint surface 8 from the penetration of particles or moisture and thus prevents the premature wear of the ball and socket joint.

If the upper part of the ball and socket joint 1b is to be protected from access, an onion-shaped embodiment of a sealing bellows 15b integrated with the ball socket 7b is to be preferred. The wall thickness of the sealing bellows may be made variable now, using a thinner wall thickness in areas that require high flexibility and a greater wall thickness in areas that require high mechanical stability. The sealing bellows is sealed as was mentioned before or it may also be established with a separate rubber ring 21, as is shown in FIG. 2b.

The embodiments of a ball and socket joint 1, 1a and 1b according to the present invention that have been presented so far pertain to high-performance ball and socket joints with low torques. However, some applications require ball and socket joints with defined torques. These are defined as ball and socket joints in which a certain torque must be applied in order to tilt the ball pivot 2 around the center of the ball head 4. The torque is set by setting a certain surface pressure on the joint surface 8.

Figure 3A:
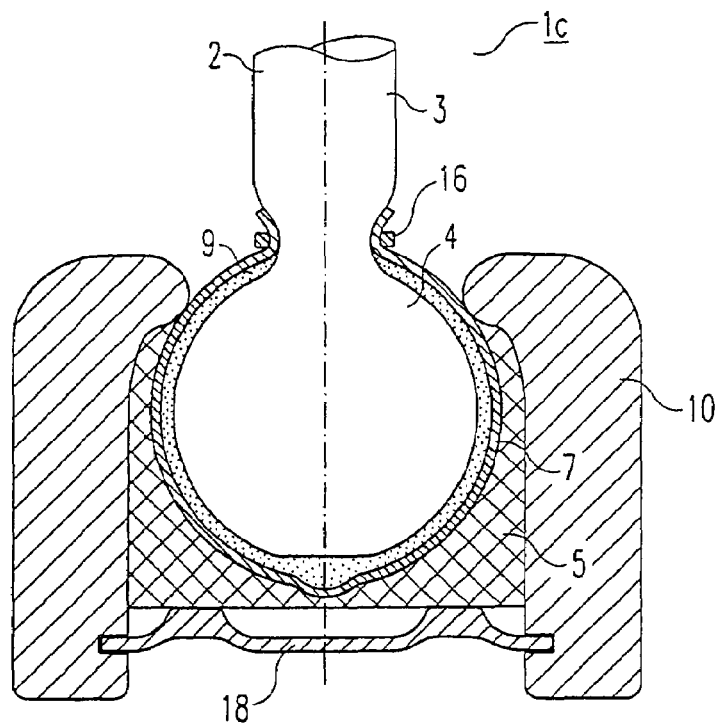
FIG. 3a is an embodiment of a ball and socket joint according to the present invention for setting a defined joint torque.

The exemplary embodiment of a ball and socket joint 1c according to the present invention, which is shown in FIG. 3a, shows a housing 10, whose upper edge 19 is rolled in in order to narrow the space filled by the material of the bearing shell 5 or to exert pressure on the bearing shell 5. A corresponding pressure is also exerted on the underside of the bearing shell 5 by pressing in a ring 18. The tension thus exerted on the bearing shell 5 increases the pressure in the area of the joint surface 8 and consequently the torque of the ball and socket joint 1c.

Figure 3B:
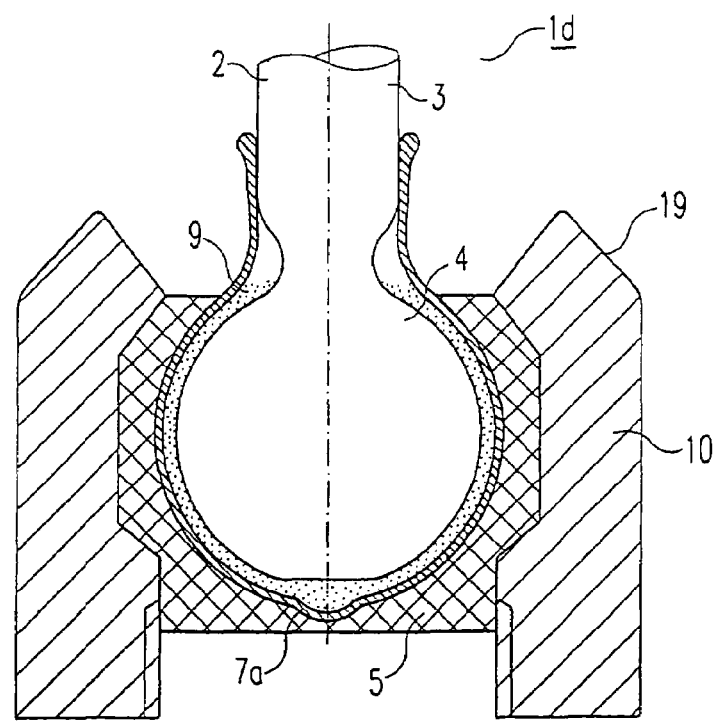
FIG. 3b is an alternative embodiment of a ball and socket joint according to the present invention for setting a defined joint torque.

As an alternative to this, a certain torque can also be set, for example, corresponding to a preset value, at 1-3 Nm, 5 Nm or the like by folding over the upper edge 19 of a housing 10, as is shown in FIG. 3b. This embodiment 1d is especially suitable for ball and socket joints that have a mounting thread in the lower area of the ball and socket joint, mainly in a lower opening of the housing 10. The inner wall of the housing 10 more or less follows here the geometry of the ball socket, so that the wall thickness of the bearing shell 5 varies only minimally. By pressing in the upper edge 19 of the housing 10, pressure can be exerted on the bearing shell 5, and this pressure is distributed uniformly over the joint surface 8 because of the relatively uniform wall thickness of the bearing shell 5.

This retensioning of the bearing shell 5 described in reference to the views in FIGS. 3a and 3b to achieve a defined torque of the ball and socket joint 1c or 1d may be performed both before, during or after the curing of the material introduced into the housing 10 to form the bearing shell 5.

While specific embodiments of the invention have been shown and described in detail to illustrate the application of the principles of the invention, it will be understood that the invention may be embodied otherwise without departing from such principles.

What is claimed is:

1. A process for manufacturing a ball and socket joint having
   a ball pivot comprising a pivot pin with an essentially spherical ball head arranged or made integrally in one piece on one side,
   a bearing shell,
   a plastic film as a thin-walled ball socket with a joint surface surrounding said ball head at least partially, and
   a lubricant introduced between the surface of said ball head and said joint surface of said thin-walled ball socket, the process comprising the steps of:
   a) filling said thin-walled ball socket with said lubricant;
   b) introducing said ball head of said ball pivot into said thin-walled ball socket filled with said lubricant;
   c) introducing said ball head, provided with said thin-walled ball socket, into a housing; and
   d) filling up of at least part of a free space between said thin-walled ball socket and said housing with a material to form said bearing shell.

2. A process in accordance with claim 1, wherein said plastic film used as said thin-walled ball socket is formed by deep drawing a plastic tube that is open on one side or on both sides.

3. A process in accordance with claim 1, wherein said plastic film is formed in the form of a cap with an opening and an essentially spherical convex bottom.

4. A process in accordance with claim 1, wherein at least one said chamber for receiving a lubricant reservoir is formed in the area of said joint surface of said plastic film.

5. A process in accordance with claim 4, wherein a chamber for receiving a lubricant reservoir is formed in said plastic film in an area of said joint surface by tying up and/or welding one end of a thin-walled plastic tube.

6. A process in accordance with claim 4, wherein a chamber for receiving a lubricant reservoir is formed in said plastic film in the pole area of said joint surface.

7. A process in accordance with claim 4, wherein a chamber for receiving a lubricant reservoir is formed in said plastic film in an equatorial area of said joint surface.

8. A process in accordance with claim 1, wherein said plastic film is made of one or more of a thermoplastic, an elastomer and a thermoplastic elastomer.

9. A process in accordance with claim 1, wherein said opening in said plastic film forms a sealing bellows.

10. A process in accordance with claim 1, wherein a duroplastic material is used to form the bearing shell.

11. A process in accordance with claim 1, wherein a defined torque of said ball and socket joint is set by deforming or bracing said housing against said bearing shell.

12. A ball and socket joint, comprising:
a ball pivot comprising a pivot pin with an essentially spherical ball head arranged or made integrally in one piece on one side;
a bearing shell;
a thin-walled ball socket with a joint surface surrounding said ball head at least partially, said thin-walled ball socket comprising a plastic film, said plastic film of said thin-walled ball socket being formed in the form of a cap with an opening and an essentially spherical convex bottom;
a lubricant introduced between a surface of said ball head and said joint surface of said thin-walled ball socket.

13. A ball and socket joint in accordance with claim 12, wherein said plastic film is a preformed plastic film.

14. A ball and socket joint in accordance with claim 12, wherein said thin-walled ball socket is formed by deep drawing a plastic tube that is open on one side or on both sides.

15. A ball and socket joint in accordance with claim 12, wherein at least one chamber for receiving a lubricant reservoir is formed in the area of said joint surface of said plastic film.

16. A ball and socket joint in accordance with claim 12, wherein a chamber for receiving a lubricant reservoir is formed in said plastic film in an area of said joint surface by tying up and/or welding one end of a thin-walled plastic tube.

17. A ball and socket joint in accordance with claim 12, wherein a chamber for receiving a lubricant reservoir is formed in said plastic film in the pole area of said joint surface.

18. A ball and socket joint in accordance with claim 12, wherein a chamber for receiving a lubricant reservoir is formed in said plastic film in an equatorial area of said joint surface.

19. A ball and socket joint in accordance with claim 12, wherein said plastic film is made of one or more of a thermoplastic, an elastomer and a thermoplastic elastomer.

20. A process in accordance with claim 12, wherein an opening in said plastic film forms a sealing bellows.

21. A ball and socket joint in accordance with claim 12, wherein said bearing shell is made of a duroplastic material.

22. A ball and socket joint in accordance with claim 12, wherein said housing is deformed or braced against said bearing shell to set a defined torque.

23. A ball and socket joint, comprising:
a ball pivot comprising a pivot pin with an essentially spherical ball head arranged or made integrally in one piece on one side;
a bearing shell;
a thin-walled ball socket with a joint surface surrounding said ball head at least partially, said thin-walled ball socket comprising a plastic film;
a lubricant introduced between a surface of said ball head and said joint surface of said thin-walled ball socket, at least one chamber for receiving a lubricant reservoir is formed in the area of said joint surface of said plastic film.

* * * * *

UNITED STATES PATENT AND TRADEMARK OFFICE
CERTIFICATE OF CORRECTION

PATENT NO. : 7,325,289 B2  Page 1 of 1
APPLICATION NO. : 10/900744
DATED : February 5, 2008
INVENTOR(S) : Budde et al.

It is certified that error appears in the above-identified patent and that said Letters Patent is hereby corrected as shown below:

Title Page Should Read

(73)　　Assignee:　　ZF  Lemförder  Metallwaren AG  (DE)

Signed and Sealed this

Twenty-seventh Day of May, 2008

JON W. DUDAS
*Director of the United States Patent and Trademark Office*